(12) United States Patent
Janeke

(10) Patent No.: US 9,297,625 B2
(45) Date of Patent: Mar. 29, 2016

(54) APPARATUS AND METHODS FOR HYPERSONIC NOSECONE

(71) Applicant: Charl E. Janeke, Los Angeles, CA (US)

(72) Inventor: Charl E. Janeke, Los Angeles, CA (US)

(\*) Notice: Subject to any disclaimer, the term of this patent is extended or adjusted under 35 U.S.C. 154(b) by 0 days.

(21) Appl. No.: 14/564,024

(22) Filed: Dec. 8, 2014

(65) Prior Publication Data

US 2015/0369576 A1    Dec. 24, 2015

Related U.S. Application Data

(63) Continuation-in-part of application No. 14/313,976, filed on Jun. 24, 2014, now abandoned.

(60) Provisional application No. 61/838,754, filed on Jun. 24, 2013.

(51) Int. Cl.
| | |
|---|---|
| *B64C 1/38* | (2006.01) |
| *F42B 12/02* | (2006.01) |
| *F42B 15/34* | (2006.01) |
| *B64G 1/62* | (2006.01) |

(52) U.S. Cl.
CPC . *F42B 12/02* (2013.01); *B64G 1/62* (2013.01); *F42B 15/34* (2013.01)

(58) Field of Classification Search
USPC ........................ 244/130, 1 N, 158.1
See application file for complete search history.

(56) References Cited

U.S. PATENT DOCUMENTS

| | | | | |
|---|---|---|---|---|
| 2,624,281 | A * | 1/1953 | McNally | 60/201 |
| 3,128,964 | A * | 4/1964 | Le Bel | 244/159.1 |
| 3,794,274 | A * | 2/1974 | Eknes | 244/130 |
| 4,573,648 | A * | 3/1986 | Morenus et al. | 244/3.22 |
| 4,817,892 | A | 4/1989 | Janeke | |
| 4,917,335 | A * | 4/1990 | Tidman | 244/130 |
| 5,191,761 | A | 3/1993 | Janeke | |
| 6,213,431 | B1 | 4/2001 | Janeke | |
| 6,464,171 | B2 * | 10/2002 | Ruffin | 244/130 |
| 6,536,350 | B2 * | 3/2003 | Cartland et al. | 102/374 |
| 6,648,275 | B2 | 11/2003 | Janeke | |
| 6,974,111 | B2 | 12/2005 | Janeke | |
| 7,344,111 | B2 | 3/2008 | Janeke | |
| 7,357,351 | B2 * | 4/2008 | Schmidt | 244/1 N |
| 7,690,601 | B2 | 4/2010 | Janeke | |
| 8,215,589 | B2 * | 7/2012 | Janeke | 244/158.9 |
| 8,505,852 | B2 | 8/2013 | Janeke | |
| 2015/0048208 | A1 * | 2/2015 | Janeke | 244/130 |

\* cited by examiner

*Primary Examiner* — Christopher P Ellis
(74) *Attorney, Agent, or Firm* — J Curtis Edmondson; Law Offices of J Curtis Edmondson

(57) ABSTRACT

An apparatus and method for mitigating the shock front or reducing drag of a rocket or aerospace plane flying at hypersonic speeds by using a modified nose cone that incorporates a low temperature substance, such as liquid nitrogen, and where the nose cone simultaneously interacts with the ambient air to further supercool the nose cone during operation.

6 Claims, 5 Drawing Sheets

APPARATUS AND METHODS FOR HYPERSONIC NOSECONE

CROSS REFERENCE TO RELATED APPLICATIONS

The present application claims the benefit of U.S. Utility patent application Ser. No. 14/313,976, filed on Jun. 24, 2014 and entitled "Thermally Conductive Hypersonic Nosecones" and U.S. Provisional Patent Application No. 61/838,454, filed on Jun. 24, 2013 and entitled "Hypersonic Vortex Tube," which is herein incorporated by reference in its entirety.

GOVERNMENT FUNDING

No government funding was utilized for this invention.

BACKGROUND

This inventive subject matter relates to the systems, apparatus, and methods for the reduction of drag in a spacecraft or missiles. The reduction of drag in spacecraft and missiles is of particular concern as atmospheric friction can cause the nosecone to increase beyond the failure point. Clearly ways to reduce would benefit missiles, allowing them to travel at higher speeds, and spacecraft, allowing them to reenter the atmosphere without the fear of destruction.

SUMMARY OF THE INVENTION

The invention comprises the systems, apparatus, and methods for the reduction of drag in a missile using a vortex tube.

Illustrated herein is a method for reducing drag at hypersonic speed that includes the steps of mounting a liquefacting nosecone on the forward portion of a projectile; where the projectile is either a missile or spacecraft.

Further describes is a method for reducing drag at hypersonic speed also having the steps of drawing an atmosphere external to the liquefacting nose cone an intake aperture or a discharge shaft.

Further presented is a method for achieving hypersonic transport that has an aerospace plane intercontinental hypersonic airliner equipped with a hypersonic vortex generator in support turbojet powered hypersonic means.

This specification is not limited to a single embodiment, rather the methods and systems presented should be construed broadly and further incorporate the material presented in the drawings.

DETAILED DESCRIPTION

Figure 1:
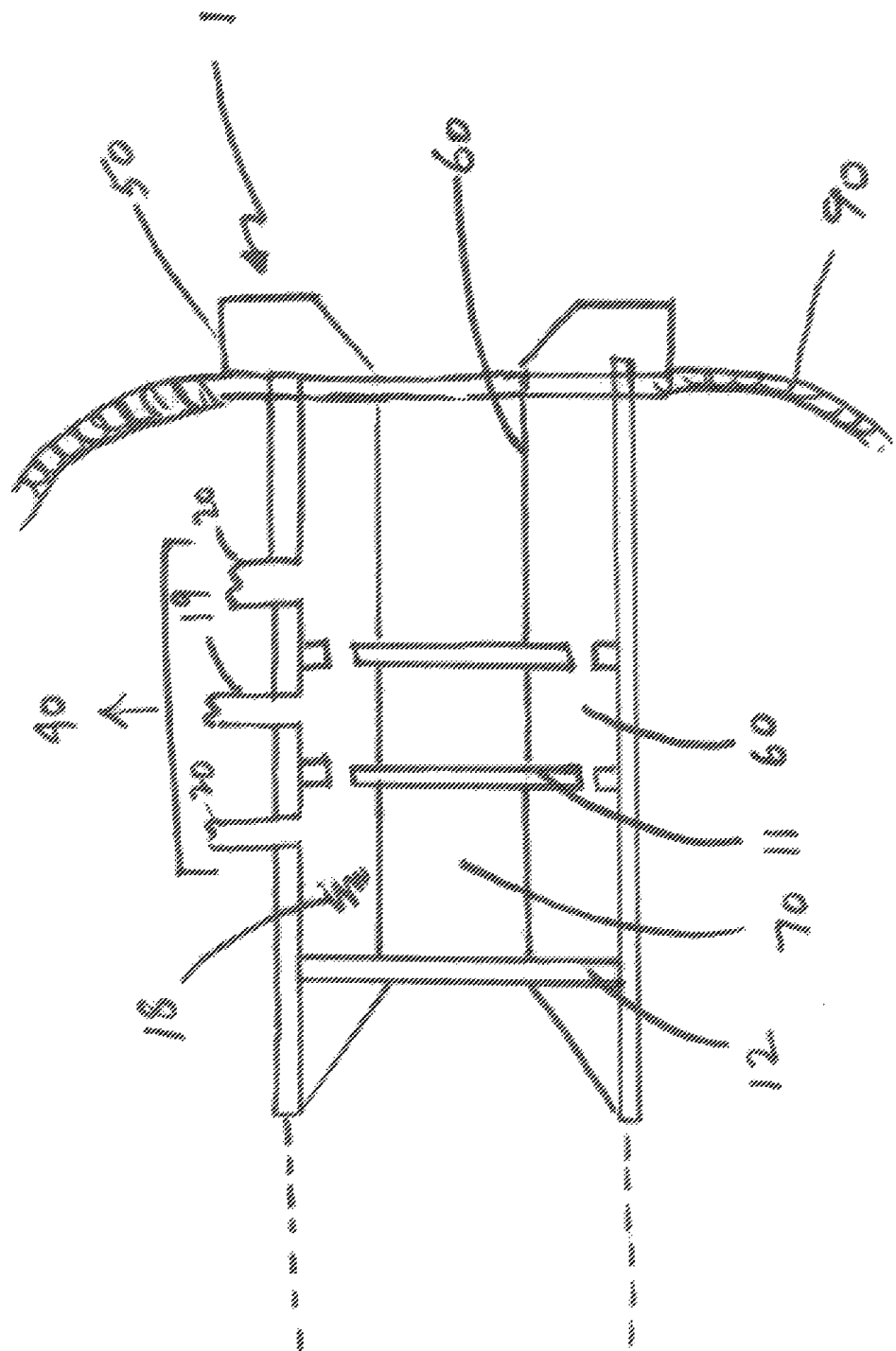
FIG. 1 illustrates the hypersonic nose cone.

Referring to FIG. 1 which illustrates the components of the conductive nose cone 1. A cooling fluid 18, typically liquid nitrogen, circulates by injection by the input line 19 into the shaft 60, and exiting via the exit lines 20. The cooling fluid 18 is provided by the cooling fluid source 40.

Inside the shaft 60, is a space for the cooling fluid 18. A perforated Teflon w washer 11, glass tube 12, laser aiming point 13 and thermocouple sensor probe 14. The incoming hypersonic streamline 17 is instantaneously transformed into a rotation vector as a consequence of rapid harmonic/isothermal compression surges on the reaction plane 112.

The thermally conductive cone 1 is composed of a tip 50, a shaft 60, and a bore 70. The entry part of the tip 50 has an intake area that is larger in circumference that the bore 70. The angle of intake area is approximately 30-60 degrees relative to a line drawn in parallel with the bore edge. In a representative embodiment, the intake bore shaft is 5/16 inches and the outer area of the intake is 14/16 inches. Adjusting the scale of the entire apparatus will not affect the ability of the device to reduce drag.

Figure 2:
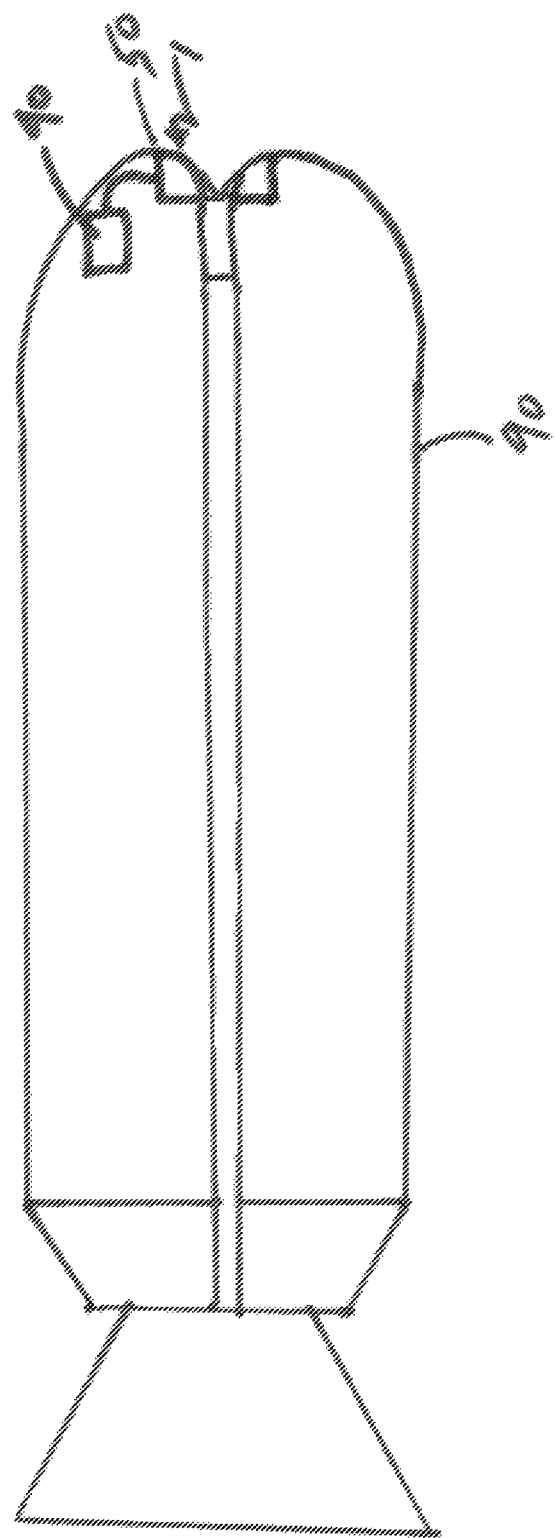
FIG. 2 illustrates the configuration on a hypersonic nose cone on a missile.

Now referring to FIG. 2 which illustrates a single or multi-stage missile or rocket 90 with a thermally conductive cone 1 based on the double helix vortex phenomenon driven by a rapid isothermal compression surges on the reaction plane.

Figure 3:
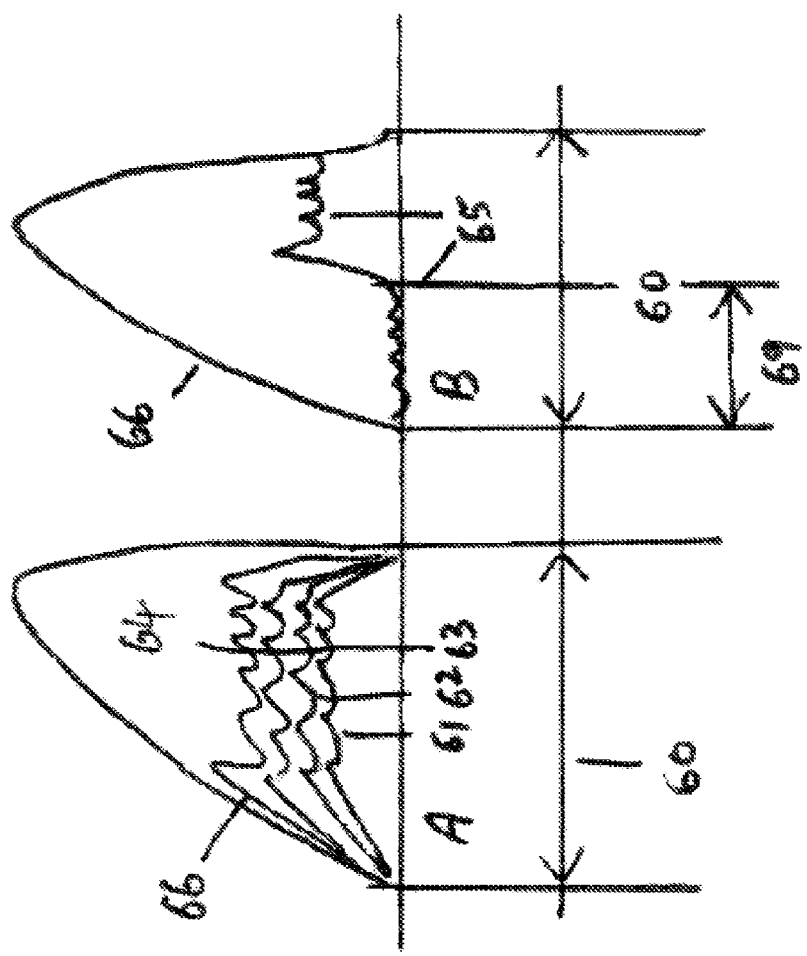
FIG. 3 illustrates a schematic rendering of the stagnation pressure surges.

Now referring to FIG. 3 which illustrates a schematic rendering of the stagnation pressure surges. Pressure surges 61,62,63,64 (diagram A) denotes the stagnation transients for the 30/45/60 degree (60/90/120 degree enclosed angle) ablative shear/reaction planes chilled to −160C. Pressure surge 65 (diagram B) denotes the pressure surge with −25C chilling only. Whereas traces 61,62,63,64 (diagram A) which demonstrate the consequence of hypersonic liquefaction and shows an immediate surge responses trace 65 which indicated an initial (inertia) lag of 1 sec prior to defaulting into conformal stagnation surging. Time periods 60 and 66 (diagrams A and B) denotes a 3 sec testing window and stagnation potential respectively.

Figure 4:
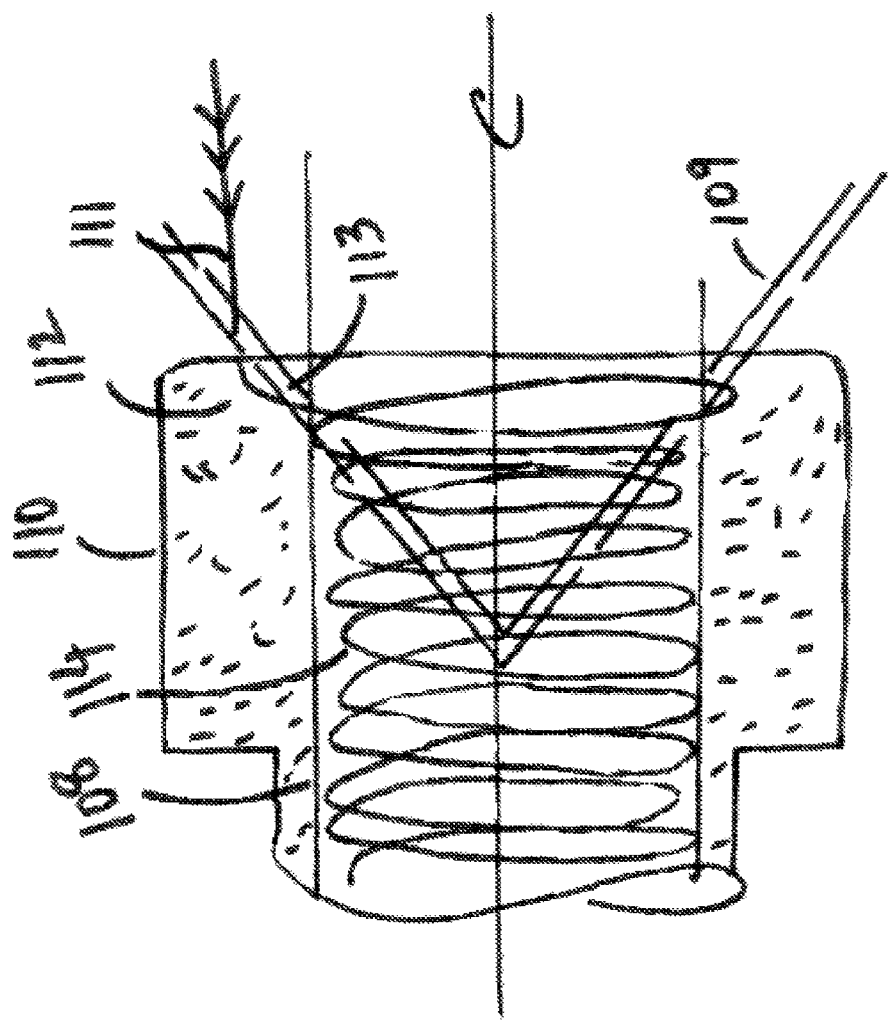
FIG. 4 illustrates the vortex triggering transformation.

Now referring to FIG. 4 which illustrates the vortex triggering transformation of the incipient hypersonic streamline 111 via the supercooled shear transformation plane 112 the nosecone 110 into a circular streamline 113. The subsequent developed vortex transgressing 114 down the supercooled bore 70. The coupling vector 109 is shown for reference purposes.

Figure 5:
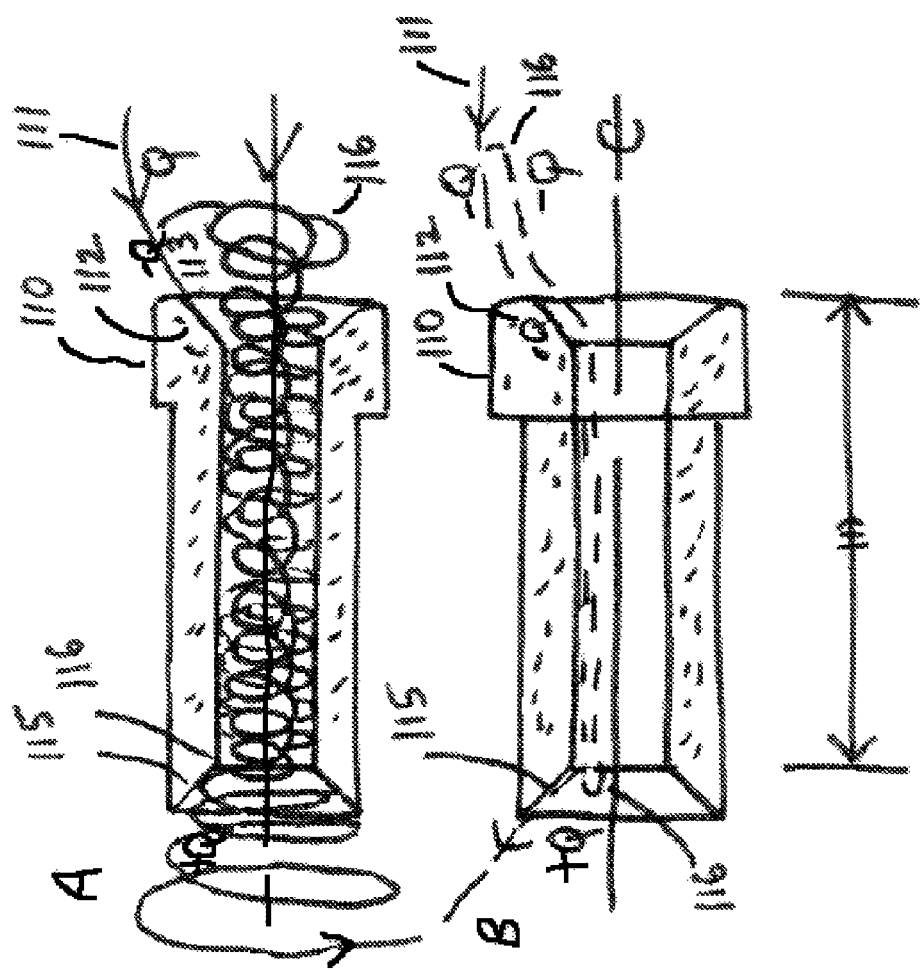
FIG. 5 which illustrates the transformation of the incipient shear vortex.

Now referring to FIG. 5 which illustrates the transformation of the incipient shear vortex item 115 ensuing from the shear transformation of the hypersonic streamline item 111 the on reaction plane item 112. The generation of the refractive (double helix) contraflow vortex item 116. Schematic A illustrates the vortex Schematic B illustrates the flow pattern schematically. Item 117 illustrates the double helix.

Persons skilled in the art will recognize that many modifications and variations are possible in the details, materials, and arrangements of the parts and actions which have been described and illustrated in order to explain the nature of this inventive concept and that such modifications and variations do not depart from the spirit and scope of the teachings and claims contained therein.

All patent and non-patent literature cited herein is hereby incorporated by references in its entirety for all purposes.

I claim:

1. A thermally reactive nosecone mounted on a projectile for achieving hypersonic transport comprising:
   a tip, the tip having a slanted intake aperture;
   a shaft;
   a thermally reactive bore and
   the nosecone functioning as a vortex generator.

2. The nosecone as described in claim 1, wherein the vortex triggering transformation of an incipient hypersonic streamline to a circular streamline is via a shear transformation plane.

3. The nosecone as described in claim 2, wherein the circular streamline transgresses through the super cooled bore.

4. The nose cone as described in claim 1, wherein the shear vortex ensuing from the shear transformation of an incipient hypersonic streamline is transformed into a refractive double helix contraflow vortex.

5. The nosecone as described in claim 1, wherein the vortex triggering transformation defaults into a hypersonic (RANQUE) refrigeration engine.

6. The nosecone as described in claim 1, wherein the hypersonic (RANQUE) refrigeration engine is CARNOT compliant in the cryogenic zone and JOULE-THOMSON driven outside the cryogenic zone.

* * * * *